(No Model.)

A. C. ESTABROOK.
DEVICE FOR FINISHING COVERED EYELETS.

No. 566,850. Patented Sept. 1, 1896.

Witnesses
Oscar F. Hill.
Robert Wallace.

Inventor
Hanson C. Estabrook
by Macleod Calver & Randall
Attorneys.

UNITED STATES PATENT OFFICE.

ALANSON C. ESTABROOK, OF NORTHAMPTON, MASSACHUSETTS.

DEVICE FOR FINISHING COVERED EYELETS.

SPECIFICATION forming part of Letters Patent No. 566,850, dated September 1, 1896.

Application filed January 3, 1896. Serial No. 574,192. (No model.)

*To all whom it may concern:*

Be it known that I, ALANSON C. ESTABROOK, a citizen of the United States, residing at Northampton, in the county of Hampshire and State of Massachusetts, have invented certain new and useful Improvements in Devices for Finishing, &c., Covered Eyelets, of which the following is a specification, reference being had therein to the accompanying drawings.

In the manufacture of covered eyelets, that is, eyelets having the flanged ends thereof provided with molded coverings or heads formed of plastic material, it frequently happens that the edge of the molded head or covering of an eyelet does not leave the molding-dies in a smooth and finished condition, but is slightly rough and also has projecting therefrom, in some cases, a small irregularly-shaped mass of the material of which the molded head is composed. This irregular projection or "flash," which frequently results from the operation of molding, is undesirable. It has been proposed heretofore to remove this flash by tumbling the covered eyelets after they leave the dies, but this is objectionable in that the glossy surface of the covering is deadened by the tumbling operation and thereby the eyelets are rendered less desirable.

My present invention has for one of its objects to provide means for speedily and economically removing the flash from the covered eyelets without in any way interfering with the glossy appearance of the covering or otherwise impairing the eyelet. After the molding of the heads or coverings upon the eyelets the latter are discharged from the molding-dies, and subsequently they are inspected to discover imperfections, after which they are counted and packed. These operations heretofore have involved several handlings of the covered eyelets, from which it has resulted that the coverings have lost more or less of their freshness and gloss and those of the more delicate colors have become soiled.

A second object of my invention is to obviate practically all necessity for contact of the hands with the eyelets after having the heads or coverings molded thereon and at the same time to provide properly for the inspection, counting, and packing of the eyelets.

My invention is fully set forth in the following descriptions and the novel features thereof are pointed out in the claims, which are appended hereto and which form a part hereof.

Figure 1:
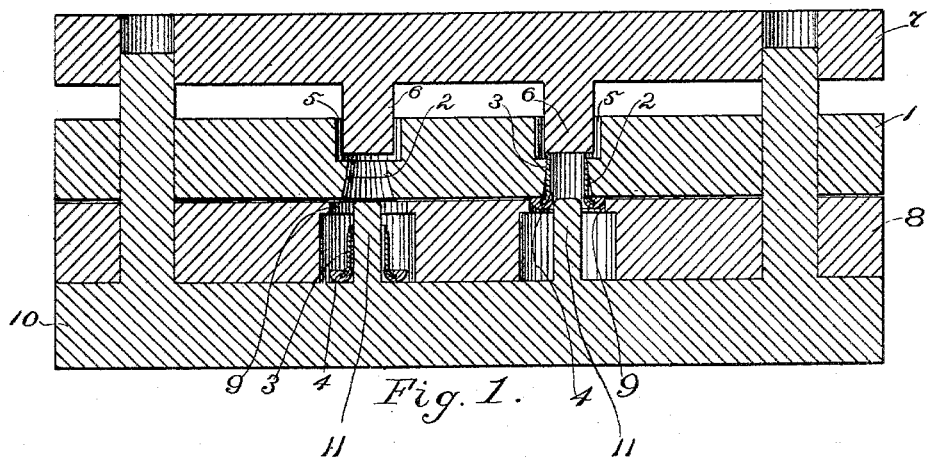
Figure 2:
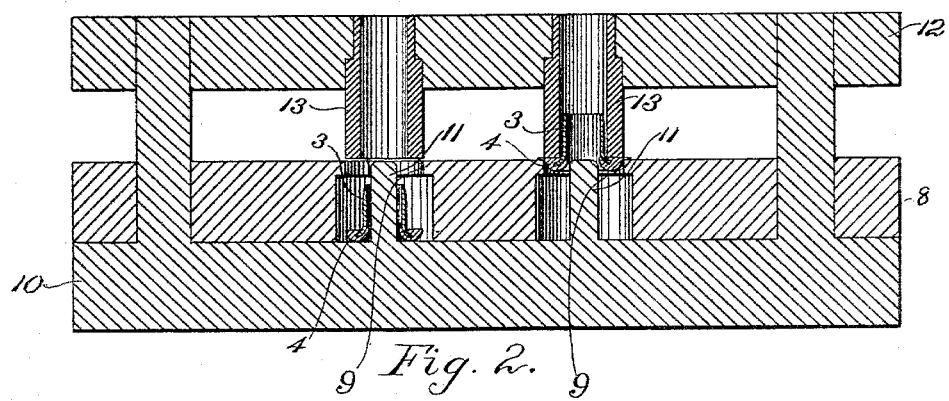
Figure 3:
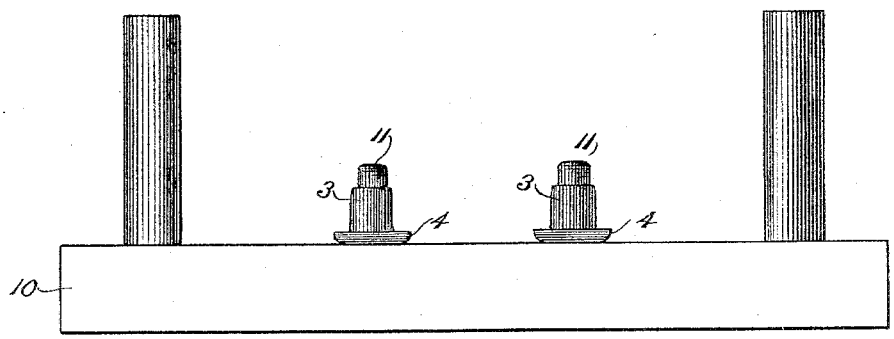

In the accompanying drawings, Figure 1 is a view showing in section one of the molding-dies, a discharging-plate applied thereto, a finishing or stripping die-plate applied in position to receive the eyelets as they are discharged from the molding-dies, and a pin-plate. Fig. 2 is a similar view showing the said die-plate and pin-plate and, in addition, the punch-plate which coöperates with the said die-plate in stripping or finishing the eyelets. Fig. 3 is a similar view showing the pin-plate detached, with a series of eyelets thereon.

1, Fig. 1, is one of the mold-plates which are employed for the purpose of applying heads or coverings of plastic material to the flanges of the eyelets, as aforesaid. This mold-plate has holes 2 2 therein for the reception of the barrels of the eyelets. 3 3 are a series of eyelets, which during the molding operation have their barrels located in the said holes. 4 4 are the molded heads or coverings which are applied to the eyelets. In Fig. 1 the molding operation is supposed to be completed, and the companion mold-plate, by which the rounded or convex portions of the heads or coverings are shaped, is supposed to have been removed. The mold-plate 1 is recessed at its reverse side, as at 5 5, the recesses corresponding in position with the holes 2 2, but being larger in diameter than the said holes, so as to enable the recesses to receive the discharging-projections 6 6 of greater diameter than the inner ends of the barrels of the eyelets, the said projections being provided on a discharging-plate 7. By the action of the said plate 7 and its projections 6 6 the eyelets are discharged from the holes 2 2 of the mold-plate 1. Fig. 1 shows a die-plate 8, having holes 9 9 therethrough, these holes corresponding closely in diameter with the molded heads of the eyelets, so as just to permit heads to pass through the same that are perfectly formed; that is to say, which have no projecting flash. The holes 9 9 correspond in arrangement with the holes 2 2 of the mold-plate 1, and when die-plate 8 is placed in position, as in Fig. 1, the said holes 9 9 register with the said holes 2 2. The holes 9 9 are counterbored, as shown, at the reverse side of the die-plate 8 to afford clearance to the eyelets after they have passed down into and partly through the holes 9 9. 10 is a counting-plate having pins 11 11 thereon, which pins, when plate 10 is placed beneath die-plate 8, as shown in Figs. 1 and 2, project centrally into the holes 9 9. The parts having been assembled as in Fig. 1, the action of the discharging-plate and its projections, when said plate is pressed downward, causes the heads of the eyelets to pass down into holes 9 9 of the die-plate, the pins 11 11 entering the central holes through the eyelets. Such of the eyelets as are formed without projecting flashes or the like pass on down into the holes 9 9, being retained in place on the pins 11 11 of counting-plate 10. Such as have projecting flashes are arrested thereby from passing into the holes 9 9 and will remain seated in inverted position in the mouths of the corresponding holes 9 9. The mold-plate and discharge-plate having been separated, the punch-plate 12 is applied, as indicated in Fig. 2. The said punch-plate is provided with annular punches 13 13, which engage by their ends with the flat under faces of the molded heads or coverings, the said faces being shown turned uppermost in Fig. 2. On pressure being applied to the punch-plate the punches force the eyelets downwardly through the holes 9 9 and operate to cut or break off the flash. By this means the edges of the molded heads or coverings are trimmed smoothly and evenly, leaving the eyelets of perfectly uniform size and of finished appearance. As the punches descend the pins 11 11 pass into the central holes thereof.

After the removal of the plate 10 from the finishing devices the eyelets are exposed to view on the pins 11 11 thereof in position to be inspected. The number of pins upon the said plate being known, it will of course be apparent how many eyelets have been treated, and thus the plate 10 and its pins 11 11 serve for counting. From the plate 10 the eyelets may be discharged into the receptacles which are intended therefor. As will be evident, no contact of the hands with the molded coverings or heads of the eyelets is necessary at any time during the herein-described operations in the manipulation of the eyelets.

I claim as my invention—

1. The combination with a mold-plate which assists in applying heads or coverings of plastic material to the flanged ends of eyelets, and which is provided with a series of receptacles for the barrels of the said eyelets, and means to discharge the said eyelets from the said receptacles, of a die-plate having holes therethrough of a diameter corresponding with the outside diameter of a perfect molded head or covering, a counting-plate applied beneath the said die-plate to receive the eyelets when they pass therethrough, and means to force through the holes of the said die-plate the eyelets which have been arrested by engagement of the margins of the said holes with flashes or projecting portions on the molded heads or coverings aforesaid, substantially as and for the purposes set forth.

2. Devices for finishing the edges of the heads of covered eyelets, comprising a die having an opening equal in diameter to the diameter of the head of a finished eyelet, and means to force the eyelet through the said opening, whereby to remove a flash or projecting portion from the edge of the head, combined with a plate having means to receive the eyelets as they descend and retain them in position for being inspected and counted, substantially as set forth.

3. Devices for finishing the edges of the heads of covered eyelets, comprising a die having an opening equal in diameter to the diameter of the head of a finished eyelet, and means to force the eyelet through the said opening, whereby to remove a flash or projecting portion from the edge of the head, combined with a plate having a pin which projects into the opening in said die and passes into the barrel of the eyelet as the latter descends, thereby retaining the said eyelet in position for inspection and counting after the separation of the parts, substantially as set forth.

In testimony whereof I affix my signature in presence of two witnesses.

ALANSON C. ESTABROOK.

Witnesses:
 FRANK N. LOOK,
 SAMUEL PORTER.